United States Patent [19]

Göbel

[11] Patent Number: 4,847,016
[45] Date of Patent: Jul. 11, 1989

[54] PROCESS FOR THE CONTINUOUS HYDROGENATION OF FATS, FATTY ACIDS AND FATTY ACID DERIVATIVES IN THE PRESENCE OF A HETEROGENEOUS CATALYST

[75] Inventor: Gerd Göbel, Erkrath, Fed. Rep. of Germany

[73] Assignee: Henkel Kommanditgesellschaft auf Aktien, Duesseldorf, Fed. Rep. of Germany

[21] Appl. No.: 8,706

[22] Filed: Jan. 29, 1987

[30] Foreign Application Priority Data

Jan. 29, 1986 [DE] Fed. Rep. of Germany ....... 3602525

[51] Int. Cl.$^4$ .............................................. C11C 3/12
[52] U.S. Cl. ..................................................... 200/409
[58] Field of Search ........................................ 260/409

[56] References Cited

U.S. PATENT DOCUMENTS

| | | | |
|---|---|---|---|
| 2,609,346 | 9/1952 | Faulkner | 260/409 |
| 2,750,263 | 6/1956 | De Nora et al. | 260/409 |
| 2,750,429 | 6/1956 | De Nora et al. | 260/409 |
| 3,444,221 | 5/1969 | Voeste et al. | 260/409 |
| 3,969,382 | 7/1976 | Zosel | 260/409 |
| 4,510,091 | 4/1985 | Rosen | 260/409 |

FOREIGN PATENT DOCUMENTS

| | | | |
|---|---|---|---|
| 651667 | 11/1962 | Canada | 260/409 |
| 2441152 | 3/1975 | Fed. Rep. of Germany | 260/409 |
| 17462 | 9/1963 | Japan | 260/409 |
| 658188 | 10/1951 | United Kingdom | 200/409 |

OTHER PUBLICATIONS

Chemical Abstracts 87: 199383b.

Primary Examiner—J. E. Evans
Attorney, Agent, or Firm—Ernie G. Szoke; Wayne C. Jaeschke; Real J. Grandmaison

[57] ABSTRACT

For continuous heterogeneous hydrogenation, fats, fatty acids and/or fatty acid derivatives are brought into contact with hydrogen in the presence of a heterogeneous catalyst dispersed in a liquid phase in a tubular packed reactor, of which the length-to-diameter ratio is $\geq 10:1$, under pressure of from 0.5 to 300 bar and at temperatures of from 60° to 260° C. The reactor is packed with a geometrically regularly arranged elements of a material inert to the components under the reaction conditions, and the hydrogen is passed through the reactor in parallel current or countercurrent to the fatty acid substrate under a gas velocity of from 0.5 to 30 cm/sec., based on the overall cross-section of the reactor. Preferably the catalyst is fixed on an insoluble support and suspended in small quantities of the particular reaction product before being added to the substrate and entering the reactor.

13 Claims, 1 Drawing Sheet

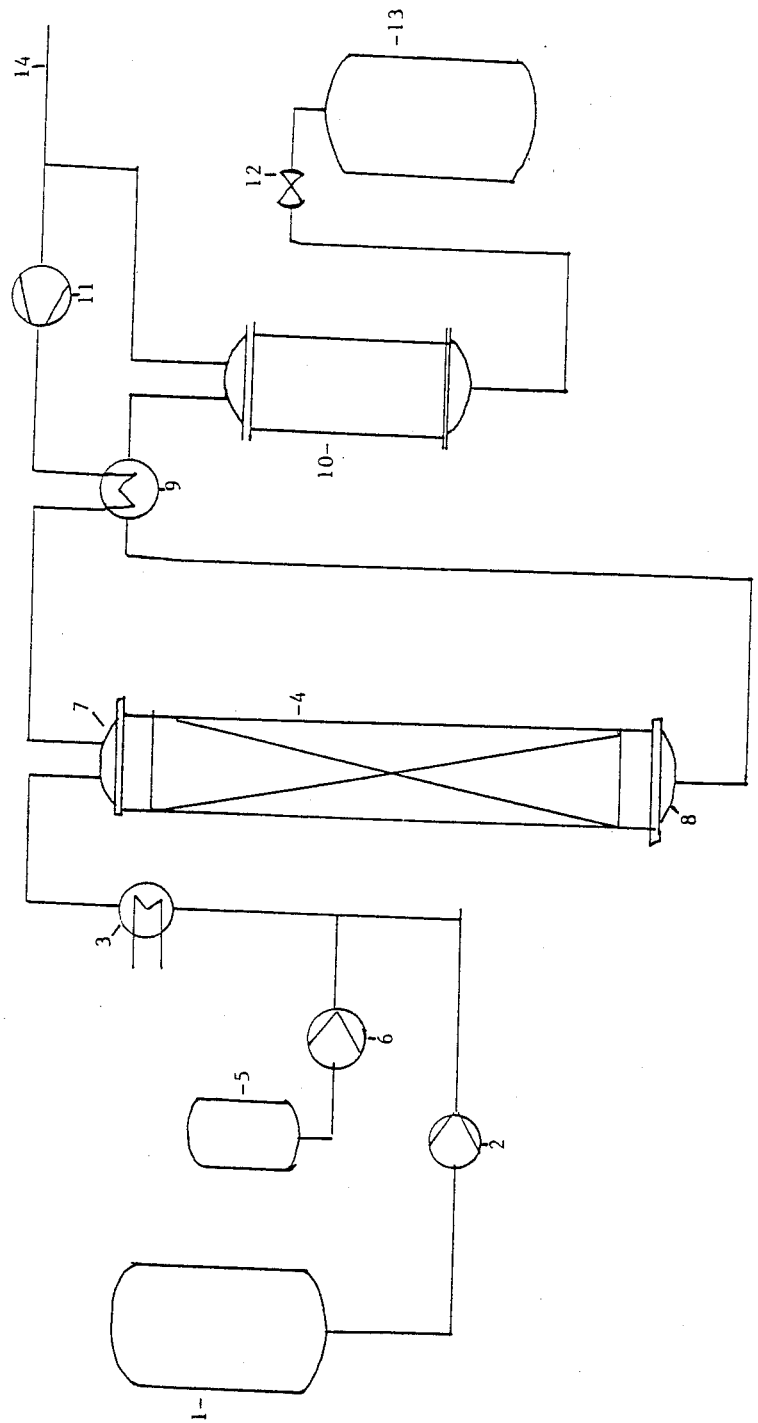

4,847,016

PROCESS FOR THE CONTINUOUS HYDROGENATION OF FATS, FATTY ACIDS AND FATTY ACID DERIVATIVES IN THE PRESENCE OF A HETEROGENEOUS CATALYST

BACKGROUND OF THE INVENTION

1. Field of the Invention

This invention relates to a process for the continuous hydrogenation of fats, fatty acids and fatty acid derivatives with hydrogen in the presence of a heterogeneous hydrogenation catalyst.

Processes for the hardening of unsaturated fats, fatty acids and fatty acid derivatives by catalytic hydrogenation are well known. Normally, the unsaturated compounds or mixtures thereof are directly reacted with hydrogen under a pressure of from 0.3 to 30 bar and at a temperature of from 50° to 250° C. in the presence of a heterogeneous hydrogenation catalyst comprising a noble metal, transition metal, or compound thereof, usually applied to a solid, insoluble support. The preferred transition metal is generally nickel.

The reaction velocity of the hydrogenation process is affected by a number of factors. One factor, which affects the reaction velocity at the beginning of the hydrogenation/hardening reaction, is the rate of transport of hydrogen from the gas phase across the phase boundary to the surface of the heterogeneous catalyst. At high hydrogenation temperatures, the rate of adsorption of the hydrogen onto the heterogeneous catalyst is also a crucial factor in determining reaction velocity. The adsorption of hydrogen onto the catalyst is based on an adsorption equilibrium which can be displaced towards better $H_2$ adsorption by an increase in pressure, which is accompanied by an increase in the rate of the hydrogenation reaction. Also, the usual deactivation of the catalyst by catalyst poisons present in the reaction mixture may be at least partly compensated by an increase in pressure. For these reasons, optimal reaction temperatures and pressures are customarily experimentally determined for each catalyst and the associated substrate, and the reaction is thus carried out under these conditions.

2. Statement of Related Art

Continuous processes for the catalytic hydrogenation of fats and derivatives thereof in the presence of heterogeneous catalysts, in which the catalyst is dispersed in the liquid reaction mixture, are well-known in the art. In typical continuous processes, hydrogenation gas bubbles are flowed through the liquid substrate in a so-called "bubble-column reactor", or, alternatively, the liquid substrate is nozzle-injected into the gas space containing hydrogenating gas in a so-called "jet nozzle reactor". In these processes and also in continuous hydrogenation processes of the type which use a parallel-flow fixed-bed reactor (all of which are used on an industrial scale), as large a phase interface as possible is normally created between the liquid substrate phase and the solid catalyst phase to enable the hydrogenation gas to be uniformly distributed between the solid and the liquid phase. Maximization of phase interface for improved uniformity of distribution of the reaction gas between the solid phase and the liquid phase is commonly accomplished by an appropriate heterogeneous catalyst design, and by using gassing stirrers or similar gas-liquid circulation systems to promote distribution of reactants. However, the precise control of reaction temperature becomes difficult as the volume of the reaction vessel increases relative to the area of the vessel heatexchange surfaces. In addition, an isothermal temperature profile is generally developed for reasons associated with process technology. In batch operation, such as the non-continuous hydrogenation process carried out in autoclaves, in which the catalyst is dispersed in the liquid reaction mixture ("read-out") process, complete conversion of the liquid substrate to the hardened product is only usually possible with long reaction times. Unfortunately, in all these types of processes, satisfactory volume-time yields are rarely achieved. Back-mixing is a particular problem.

In order to overcome some of the disadvantages of the prior art processes, the reaction vessels employed in these processes, usually reaction tubes, have been furnished with a variety of packings to enlarge the contact surfaces available. Although these packings generally provide for uniform flow of the substrates and reaction gases which are passed through them, they also often impose on these substrates and gas a residence time which is too short to enable high conversions and high volume-time yields to be obtained. In one such process of particular interest, abstracted in *Chemical Abstracts* 87: 199 383b native oils are hydrogenated in steel tubes at 180° to 220° C. under a hydrogen pressure of from 2 to 50 atms in the presence of a nickel catalyst, employing glass Raschig rings to pack the reaction tube. This process gives good hydrogenation results when fats and oils having high iodine numbers, i.e., a high degree of unsaturation, are used. Poorer results, which render this process unsuited to general industrial application, are obtained when fats and oils having a low iodine number are used. In addition, the Raschig rings are necessarily irregularily arranged in the packed reaction tube, causing a comparatively large back-up of the substrate; this in turn gives rise to an irregular residence time of the substrate or the reaction gas in the reaction tube, which inevitably results in a reduction in the volumetime yield. This is a serious disadvantage in largescale applications. In addition, it has been repeatedly observed that in this process, the catalyst tends to disperse in the substrate sediments inside the Raschig rings and block flow through the rings, especially those rings of which the longitudinal axis is at a right-angle to the flow of the substrate or the reaction gas. The entire flow cross-section of the reaction tube is thus no longer available for the hydrogenation reaction, which results in a drastic reduction in the volume-time yields; also, this reduction in flow is accompanied by gradual blockage of the catalyst bed. In view of high volume-time yield requirements this process is economically unsuitable for use on an industrial scale.

BRIEF DESCRIPTION OF THE DRAWING

The sole FIGURE comprises a flow sheet schematically illustrating the hydrogenation process and apparatus of the invention.

DESCRIPTION OF THE INVENTION

Other than in the operating examples, or where otherwise indicated, all numbers expressing quantities of ingredients or reaction conditions used herein are to be understood as modified in all instances by the term "about".

The present invention provides an improved process for the hydrogenation of fats and fat derivatives and particularly provides a continuous tube-reactor process for hardening fats in which a uniform flow velocity is obtainable over the entire flow cross-section of the reactor. In addition, the invention provides a continuous catalytic process for hardening fats and fat derivatives employing a packed tube reactor wherein the regular geometric form of the packing elements substantially precludes catalyst sedimentation and blockage of the catalyst bed. The process according to the invention is suitable for hardening both crude fatty acids and also distilled fatty acids; the residence time of the subtrate in the reactor is controlled, and permits the recovery of products that are not fully hardened, if desired. At the same time, a high volume-time yield is obtained. The improved process of the invention is predicated on the concept that, in a continuous tube reactor process for the hydrogenation of fats or fat derivatives under predetermined flow conditions for the gaseous and liquid component phases, optimization of reactor packing element geometry with phase interface maximization results in high conversions and volume-time yields with minimal back-mixing in the liquid phase.

DETAILED DESCRIPTION OF THE INVENTION

The present invention comprises a process for the continuous heterogeneous hydrogenation of fats, fatty acids and/or fatty acid derivatives with hydrogen in the presence of a heterogeneous hydrogenation catalyst dispersed in the liquid phase in a tubular packed reactor, of which the length-to-diameter ratio is $\geq 10:1$. The present process is characterized in that the reactor is packed with geometrically regular elements of a material inert to the reactants and catalyst under the reaction condition. The hydrogen is passed through the reactor in parallel flow concurrent with or counter-current to the liquid substrate, and the gas velocity is adjusted to a value of from 0.5 to 30 cm/sec., based on the overall cross-section of the reactor. The reaction proceeds under temperature and pressure conditions commonly employed in such catalytic hydrogenation reactions. The catalyst employed is a transition-metal catalyst fixed to an insoluble support, also of the type commonly employed in the catalytic hydrogenation of fats and fatty acids. Preferably the catalyst is employed as a suspension in a small portion of the reaction product.

Unsaturated fats, fatty acids and fatty acid derivatives of natural or synthetic origin are continuously hydrogenatable by the process of the invention. Substrates of natural origin are generally employed. Suitable substrates of natural origin include soya oil, sunflower oil, peanut oil, coconut oil, or other oils and fats of natural origin, as well as fatty acids and/or fatty acid derivatives obtained therefrom by lipolysis, such as, for example, $C_8$–$C_{22}$ fatty acids. In the course of the hydrogenation, the double bonds in the alkyl groups of these fatty acids or fats are substantially completely hydrogenated so that hardening is obtained, or, if desired, partially hydrogenated to obtain a product which is less than fully hardened.

Suitable catalysts for the process according to the invention are any of the catalysts normally used for hydrogenation of unsaturated fats or fatty acids. Catalysts such as these generally comprise one or more transition metals or compounds of one or more transition metals in a form suitable for hydrogenation. Catalysts comprising one or more metals from group VIII or VIIIA of the periodic system of elements and/or one or more of their compounds are preferably used for the process according to the invention. The metals iron, ruthenium, osmium, cobalt, rhodium, iridium, nickel, palladium and platinum and compounds thereof have proved to be particularly successful. For economic reasons, and also by virtue of its particular efficiency, nickel or one or more of its compounds is particularly conveniently used as catalyst for the hydrogenation of fats, fatty acids and/or fatty acid derivatives in accordance with the present invention.

The catalyst selected is applied to a commercial insoluble support standard for use in catalytic hydrogenation processes. Suitable supports include a variety of insoluble supports known for this purpose, especially silicates. A sodium-aluminium silicate support having a surface area of approximately 80 to 100 $m^2/g$ is advantageously used. Nickel is then precipitated onto the surface of the support in customary fashion, for example, nickel (II) is precipitated from a sulfate solution using sodium carbonate, and the resulting precipitate then subjected to reduction with hydrogen. Preferably, the catalyst fixed to the support is then suspended in a small quantity of a hardened fat, especially in a small quantity of a product of the reaction. Usually a proportion of catalyst material to hardened fat of about 60 to 70 parts by weight catalyst to about 30 to 40 parts by weight hardened fat provides a good suspension. Since the amount of catalyst may directly affect yield (cf. Example 2), concentrations of catalyst should be optimized. Generally concentrations of catalyst from about 0.25% to 0.75% by weight based on the weight of substrate, are suitable. The catalyst suspension is then added to the substrate to be hydrogenated, preferably before it enters the reactor.

Reactors useful for the process according to the invention comprise reactors suitable for carrying out catalytic hydrogenation reactions under pressure. Tubular reactors made of a material which is inert under the reaction conditions, for example stainless steel (Din 1.4571 or U.S. Standard 316 TI) have proved to be particularly successful. An important criterion which the geometry of the tubular reactor interior must satisfy is that the ratio of reactor length to reactor diameter is greater than or equal to 10:1, so that the reaction components are given an adequate path length in which to react with one another. Incomplete conversions are typical with reactors having a length-to-diameter ratio of less than 10:1, under the parameters of the hydrogenation process of the invention.

According to the invention, the interior of the reactor is charged with a geometrically regular packing of a material which is inert to the reaction components under the reaction conditions. The packing elements are characterized by a geometrical regularity which permits the elements to be regularly disposed within the reactor to maximize both the interface between the reaction phases ("specific phase interface") and the uniform flow of reactants within the reactor. It is preferred to use packing elements which are substantially regular in their three-dimensional arrangement, for example, geometric solids regular about a point. Packings of spherical elements meet this objective particularly well. Accordingly, packings of spheres, preferably having a diameter of from 1 to 10mm and more especially from 3 to 6mm, are suitably used for the purposes of the invention. However, the criterion of the three-dimensional regularity is also met by regularly arranged wire gauzes and commercial static mixing elements of sheet metal. It is possible to use, for example, a built-in packing of wave-form, repeatedly kinked, intersecting expanded-metal band of the type commercially employed as packing for rectification and absorption columns. Suitable reactor packing elements are, for example, the shaped bodies (Mellapak 250Y) illustrated in prospectus No. VT 2002/d (May 1977) of Sulzer AG, Wintherthur, Switzerland. Further information on reactor packings is disclosed in *Chem. Ing. Tech.* No. 12, 51: 1151–1158, 1154, 1155, (1979) incorporated herein by reference. The constituent material of the reactor packing must be inert to the reactants involved under the reaction conditions. Suitable materials are, for example, glass, ceramics or metals, although other materials are also useful provided they do not interfere with the hydrogenation process. Spherical packing elements of glass are preferably used.

The packing disposed in the reactor functions to greatly enlarge the phase interface (relative to an unpacked reactor) and to uniformly distribute the hydrogenation gas stream over the surface of the substrate to be hydrogenated. The enlargement of the phase interface is of course dependent upon the surface geometry of the packing; in the case of a packing of spheres, the specific phase interface is dependent upon the diameter of the spheres used. For example, with spheres having a diameter of approximately 6mm a specific phase interface of 620 $m^2/m^3$ is obtained. When the interior of a tube reactor is closely packed with these spheres, a relative inter-grain or interstitial volume, i.e., a volume directly available for the flow of gas and liquid through the interstices of the spheres of 0.19 (19%), is obtained. With spheres having a diameter of approximately 3mm, a specific phase interface of 1750 $m^2/m^3$ can be obtained, with a relative interstitial volume of 0.38 (38%). Surprisingly, the geometrically regular packing elements, particularly th spherical elements provide improved volume/time yields over traditional packing elements such as Raschig rings, which are characterized by a very high surface area per volume of space occupied. It is believed that the advantages obtained by prior art Raschig-type devices in obtaining contact between reaction phases is more than offset by fluid flow blockage and back-mixing which occurs in reactors packed with such devices, particularly when the devices are "dumped" rather than "stacked".

Reaction conditions used in the process of the invention are broadly those known in the art for the catalytic hydrogenation of unsaturated fatty acids, fats, and derivatives thereof. Generally the hydrogen pressures are in the range of from 0.5 to 300 bar with gas-through flows of from about 1 to 6 $Nm^3/h$, and the reaction temperatures are in the range of from 60° to 260° C.

According to the invention, the hydrogenation gas is passed through the reactor parallel to the fatty acid substrate, so that the gas and substrate flow concurrently or countercurrently. This means that the hydrogenation gas is introduced with the substrate to be hydrogenated at the head of the reactor to flow concurrently with the substrate through the interior of the reactor containing the packing, or that the hydrogenation gas is passed through the reactor countercurrent to the unsaturated substrate, so that the hydrogen flows against the substrate flowing from the head of the reactor.

In continuous operation, in concurrent flow, a so-called "plug flow" is often obtained, with the effect that all the molecules of the substrate have substantially the same residence time in the reaction; this leads to high conversions and, hence, to the high volume-time yields desired, and is a particularly effective application of the process of the invention. Countercurrent flow is only applied with advantage when the countercurrent stream of hydrogen does not interfere with the forward flow of substrate trickling through the reactor; this typically results in backmixing, with the adverse effects on the volume-time yields previously noted. Thus, in the process according to the invention, concurrent parallel flow of hydrogen and fatty acid substrate is generally preferred.

The velocity of the hydrogenation gas entering the reactor is usually adjusted to a value of from 0.5 to 30 cm/sec., preferably to a value of from 5 to 20 cm/sec., based on the overall cross-section of the reactor. Naturally, the gas velocities as measured within the reactor, based on the conditions in he interstitial region, are distinctly higher because the packing elements are an obstacle to the free flow of gas. The actual interstitial velocities are dependent on specific reaction conditions including pressure, temperature, and the particular form and arrangement of the packing. For example, in the process of the invention, the throughflow of gas is typically varied from 1 to 6 $NM^3/h$ for process pressures of from 50 to 250 bar. Under these conditions, gas in the interstitial regions can attain velocities of from 1.5 to 150 cm/sec, if glass-sphere packing is employed. Critically, the gas velocity is maintained above the minimum value at which complete hydrogenation of the substrate flowing through a certain reactor cross-section is effected. However, since the heat of reaction released during hydrogenation is dissipated through the excess reaction gas, as well as the substrate, the gas velocity is advantageously maintained above that minimum value as necessary to facilitate control of reaction temperature. When this is done, the effluent reaction gas which was not used for hydrogenation of the substrate, is advantageously recycled to the reactor to ensure that the gaseous reactant is economically used.

One embodiment of a process according to the invention is illustrated in detail by the flowsheet shown in the Figure. The liquid substrate material—oil, fatty acid or fatty acid derivative—is pumped from a vessel[1] into the mouth[7] of a tubular[4] reactor via a heat exchanger[3] by a metering pump[2]. At the same time, a suspension of catalyst (nickel on sodium-aluminum silicate) applied to an insoluble support in hardened fat is pumped in from a stirring vessel[5] by a pump[6], also via the heat exchanger[3]. Preheated hydrogen is fed in at the reactor mouth[7] parallel with the liquid phase of substrate material. The liquid substrate phase and the hydrogen gas phase pass through the reactor[4] in parallel currents under the pressure of from 0.5 to 300 bar required for complete hydrogenation. The reactor is kept at the necessary reaction temperature for complete hydrogenation of from 60° to 260° C. indirectly by a heat carrier flowing through the reactor jacket (not shown), At the reactor exit[8], the product stream flows through a heat exchanger[9] (which indirectly preheats circulating reaction as before entering reactor 4) and then passes into a gas-liquid separator[10]. From there, hydrogen is returned to the reactor mouth[7] through a recycle gas compressor[11] and the heat exchanger[9]. At the same time, chemical $H_2$-consumption is compensated for by addition of fresh hydrogen through conduit 14. The liquid hardened reaction product—fat, fatty acid or fatty acid derivative-passes through a relief valve [12] into an expansion vessel[13]. From there, it is removed for further processing, for transport, or for storage.

The process according to the invention for the continuous catalytic hydrogenation of fats, fatty acids and fatty acid derivatives has a major advantage over present commercial processes in that the volume-time yield of the hydrogenation reaction is significantly and surprisingly increased by optimal adjustment of reaction conditions (hydrogenation temperature, H$_2$-partial pressure and throughout of hydrogenation gas). Volume-time yields are further increased by maximizing the specific phase interface between the gas and liquid phases by the use of geometrically regular, especially spherical, packing elements in the tube reactor, which promotes more uniform distribution of hydrogenation gas between the solid and liquid phases. In addition, considerably better control of the reaction is possible by virtue of the dissipation of the heat of reaction through the reactants involved and through a defined residence time of the substrate in the reaction zone. In contrast to current commercial processes, this permits recovery of reaction products hardened to the desired degree. Mixtures such as these of completely and partially hydrogenated fats and fatty acids are highly desirable for certain technical applications, and products of this type are not obtainable at reasonable cost by conventional processes.

The invention is illustrated by the following Examples.

METHODS AND MATERIALS

The reactor used for the hydrogenation tests described hereinafter was a standard steel cylindrical reactor having a volume of 1500ml and a length of 1200 mm and an internal diameter of 42mm (L:D=28.6:1).

The packing was either (a) glass beads about 3mm in diameter (specific phase interface: 1750 m$^2$/m$^3$, relative interstitial volume E=0,38); or (b)glass beads about 6mm in diameter (specific phase interface: 620 m$^2$/m$^3$, E=0.19).

The catalyst used was a standard commercial nickel catalyst on a sodium-aluminium silicate support (PRI-CAT 99/12, a product of Ruhrchemie AG, Oberhausen) with a nickel content of 22% by weight which was obtained by precipitating nickel (II) sulfate with sodium carbonate onto a sodium-aluminium silicate support (specific surface: about 80 to 100 m$^2$/g) and subsequently reducing the precipitate under hydrogen. The catalyst was suspended in hardened fat (60 parts by weight of catalyst to 40 parts by weight fat).

The test results were assessed by analytically determining the acid number (A.No.), the saponification number (S.No.), the Iodine number (I.No.) and the percentage content of unsaponifiables (US) and calculating the following parameters:

$$\text{Conversion: } C = \frac{\text{I.No.}_0 - \text{I.No.}}{\text{I.No.}_0} \times 100(\%)$$

I.No$_0$ = Iodine number of the unhardened crude fatty acid $$\text{Space velocity: } LHSV = \frac{V_{FA}}{V_T}$$

LHSV = liquid hourly space velocity $V_{FA}$ = fatty acid input in cm$^3$/h $V_T$ = trickle bed volume in cm$^3$ $$\text{Volume-time yield: } VTY = \frac{LHSV \cdot C(1/h)}{100}$$

EXAMPLE 1

The starting material used was a split fatty acid which, according to analysis by gas chromatography, had the following composition (chain length and percent by weight):

saturated: C$_{10}$:0.2; C$_{12}$:0.1; C$_{14}$:2.3; C$_{15}$: 0.6; C$_{16}$:22.7; C$_{17}$:2.3; C$_{18}$:19.0; C$_{20}$:0.7;

monounsaturated: C$_{14}$:0.7; C$_{16}$:3.4; C$_{18}$:40.8; C$_{20}$: 0.9;

di-unsaturated: C$_{18}$:5.8;

tri-unsaturated: C$_{18}$: 0.5.

The split fatty acid had the following characteristics: A.No. 196; S.No. 202; I.No. 58; U.S. approx. 1% by weight.

In the reactor described in "Materials and Methods", which was fully filled with glass beads approx. 6mm in diameter, the starting material was continuously hydrogenated in the presence of a nickel catalyst ("Materials and Methods") under a pressure of 250 bar and at a reactor temperature of 220° C. (hydrogen throughput 4.0 Nm$^3$/h). The catalyst concentration was 0.25%, based on weight of substrate). Products having different characteristics, calculated in accordance with the above equations, were obtained with different quantities of unsaturated fatty acid. The results are shown in Table I below:

TABLE 1

| Input $V_{FA}$ ml/h | Product S. No. | Character-istics US | I. No. | Conversion (%) | LHSV h$^{-1}$ | VTY h$^{-1}$ |
|---|---|---|---|---|---|---|
| 400 | 199 | | 1.3 | 97.7 | 0.267 | 0.261 |
| 500 | 200 | | 1.3 | 97.7 | 0.333 | 0.326 |
| 600 | 199 | 2.6 | 1.4 | 97.6 | 0.400 | 0.390 |
| 700 | 199 | 1.9 | 1.3 | 97.7 | 0.467 | 0.456 |
| 800 | 210 | | 1.2 | 97.9 | 0.533 | 0.522 |
| 900 | 210 | | 1.3 | 97.7 | 0.600 | 0.586 |
| 1000 | 200 | | 1.8 | 96.9 | 0.667 | 0.646 |
| 1100 | 200 | | 6.2 | 89.2 | 0.733 | 0.654 |

COMPARISON EXAMPLE 1

The starting material used was the split fatty acid described in Example 1. In a stirrer-equipped autoclave, 750kg of the starting material were hydrogenated for 2h at 215° C. under a hydrogen pressure of 30 bar and in the presence of 2 kg of suspended nickel catalyst as described above (Materials and Methods: 0.27% by weight, based on starting material). The reaction volume was 1.2m$^3$.

The hardened fatty acid mixture obtained in this way had a residual iodine number of 1.0. The conversion was 98%. The volume-time yield (VTY) was thus 0.36 h$^{-1}$.

EXAMPLE 2

Split fatty acid having the composition described in Example 1 was hydrogenated under the same conditions as in Example 1, with the catalyst concentration doubled to 0.5%. The results are shown in Table 2 below.

TABLE 2

| Input $V_{FA}$ ml/h | Product S. No. | Character-istics US | I. No. | Conversion (%) | LHSV h$^{-1}$ | VTY h$^{-1}$ |
|---|---|---|---|---|---|---|
| 1100 | 202 | | 1.6 | 97.2 | 0.733 | 0.713 |
| 1200 | 202 | | 2.2 | 96.2 | 0.800 | 0.769 |
| 1300 | 201 | | 1.7 | 97.1 | 0.867 | 0.841 |
| 1400 | 200 | | 2.3 | 96.0 | 0.933 | 0.896 |
| 1500 | 202 | | 2.2 | 96.2 | 1.000 | 0.962 |

TABLE 2-continued

| Input $V_{FA}$ ml/h | Product S. No. | Characteristics US | I. No. | Conversion (%) | LHSV $h^{-1}$ | VTY $h^{-1}$ |
|---|---|---|---|---|---|---|
| 1600 | | | 2.7 | 95.3 | 1.067 | 1.027 |
| 1700 | | | 2.9 | 94.9 | 1.133 | 1.076 |
| 1800 | | | 3.0 | 94.8 | 1.200 | 1.138 |
| 1900 | | | 3.0 | 94.8 | 1.266 | 1.201 |

Result

By doubling the quantity of catalyst used in relation to Example 1, it was possible to double the volume-time yield for otherwise the same conditions. Comparison of results of Example 1 and Example 2 shows that the volume-time yield is directly proportional to the quantity of catalyst used.

EXAMPLE 3

In the same way as described in Example 1, split fatty acid having the composition described in Example 1 was hydrogenated under variable conditions in the tube reactor described under "Materials and Methods". The specific phase interface was significantly increased in relation to Examples 1 and 2 by filling the reactor with glass beads approximately 3mm in diameter. In each case, the catalyst concentration was 0.5% (based on weight of substrate); reaction temperature was 260° C. and the input of fatty acid ($V_{FA}$) 1900 ml/h.

In tests A, B and C, hydrogenation was carried out with a constant throughput of hydrogen of 1 Nm³/h. The pressure in test A was 50 bar, in test B 100 bar and in test C 250 bar.

In tests D, E and F, hydrogenation was carried out under a constant pressure of 250 bar. The hydrogen throughput was 1 Nm³/h in test D, 2Nm³/h in test E and 4 Nm³/h in test F.

The results are shown in Table 3 below.

TABLE 3

| Test | I. No. | Conversion (%) | LHSV $h^{-1}$ | VTY $h^{-1}$ |
|---|---|---|---|---|
| A | 2.2 | 96.2 | 1.357 | 1.305 |
| B | 1.2 | 97.9 | 1.357 | 1.329 |
| C | 1.3 | 97.7 | 1.357 | 1.327 |
| D | 1.3 | 97.7 | 1.357 | 1.327 |
| E | 0.8 | 98.6 | 1.357 | 1.338 |
| F | 1.1 | 98.1 | 1.357 | 1.331 |

Result

Compared with the results described in Examples 1 and 2, it was possible to obtain a further improvement in mass transfer by enlarging the phase interface using smaller packing elements. As a result, the volume-time yield showed an increase (for a slightly higher reaction temperature) over the results obtained in Examples 1 and 2.

EXAMPLE 4

The starting material used was a fatty acid mixture of animal origin which, according to analysis by gas chromatography, had the following compostion (chain length and percent by weight): saturated: $C_{14}:3$; $C_{15}:1$; $C_{16}:26$;

$C_{17}:2$; $C_{18}:17$; $C_{20}:1$;

monounsaturated: $C_{16}:2$; $C_{18}:44$; di-unsaturated: $C_{18}3$; tri-unsaturated: $C_{18}:1$.

The fatty acid mixture had the following characteristics: A.No. 205; S.NO. 206; I.No. 55.8; U.S. approx. 1%.

The fatty acid mixture was hydrogenated at 220° C./50 bar in the same way as described in Example 1, except that the described reactor was fully filled with a packing of glass beads of a diameter of 3mm.

The hardened fatty acid mixture obtained in this way had a residual iodine number of 0.5. The conversion was 99.1%. The space velocity (LHSV) was 1.43 $h^{-1}$ and the volume-time yield (VTY) 1.14 $h^{-1}$.

I claim:

1. In a high speed process for the catalytic hydrogenation of a substrate comprising an unsaturated fat, fatty acid, or derivative of an unsaturated fat obtained therefrom by lipolysis with a gas consisting essentially of hydrogen gas wherein the substrate and hydrogen are flowed in contact with a catalyst through a tubular reactor at a pressure of from about 0.5 to 300 bar and a temperature of from about 60° to 280° C. to substantially completely hydrogenate the ethylenic double bonds of the substrate, the improvement comprising flowing the substrate and gas in parallel concurrent or counter current flow through a tubular reactor having a length to diameter ratio of at least 10:1 which is packed with a plurality of regularly disposed elements inert to the reactants under the reaction conditions and characterized by a substantially regular surface geometry that permits the elements to be regularly disposed within the tubular reactor, under a gas velocity of from about 0.5 to 30cm/sec based on the total cross-section of the reactor.

2. The process of claim 1, wherein the catalyst is fixed to an insoluble support and is suspended in a portion of reaction product and added to the substrate before it is flowed through the reactor.

3. The process of claim 1, characterized in that the reactor is filled with spheres from 1 to 10mm in diameter.

4. The process of claim 2, characterized in that the reactor is filled with spheres from 3 to 6mm in diameter.

5. The process of claim 1, characterized in that the reactor is filled with spheres of glass, ceramic, or metal.

6. The process of claim 5, characterized in that the reactor is filled with spheres of glass.

7. The process of claim 1, characterized in that the hydrogen is passed through the reactor in parallel concurrent with the subtrate.

8. The process of claim 1, characterized in that the hydrogen is passed through the reactor in parallel countercurrent with the substrate.

9. The process of claim 1, characterized in that the gas velocity is from 5 to 20 cm/sec.

10. The process of claim 1, characterized in that the catalyst comprises a metal selected from the group consisting of iron, ruthenium, osmium, cobalt, rhodium, iridium, nickel, palladium, platinum and compounds thereof.

11. The process of claim 10, characterized in that the catalyst is a nickel-containing catalyst.

12. The process of claim 10, characterized in that the catalyst is a nickel-containing catalyst fixed on a sodium-aluminum silicate support.

13. The process of claim 2, characterized in that the catalyst is suspended in hardened fat and added to the reaction medium before it enters the reactor.

* * * * *